United States Patent [19]

Arai et al.

[11] Patent Number: 4,563,679

[45] Date of Patent: Jan. 7, 1986

[54] CARRIER CONTROL METHOD BY USING PHASE-PULSE SIGNALS

[75] Inventors: Yukio Arai, Saitama; Masayasu Endo, Tokyo, both of Japan

[73] Assignee: Osaki Electric Co., Ltd., Tokyo, Japan

[21] Appl. No.: 478,057

[22] Filed: Mar. 23, 1983

[30] Foreign Application Priority Data

Mar. 26, 1982 [JP] Japan .................................. 57-47241

[51] Int. Cl.⁴ ........................ H04Q 9/00; G08C 19/24
[52] U.S. Cl. .................................... 340/825.7; 307/3; 340/310 A
[58] Field of Search ............. 340/825.7, 310 R, 310 A, 340/825.9; 307/3

[56] References Cited

U.S. PATENT DOCUMENTS

| | | | |
|---|---|---|---|
| 4,163,218 | 7/1979 | Wu | 340/310 A |
| 4,179,624 | 12/1979 | Shindo et al. | 340/310 A |
| 4,340,880 | 7/1982 | Baumann et al. | 340/310 R |
| 4,370,564 | 1/1983 | Matsushita | 340/310 A |
| 4,430,639 | 2/1984 | Bennett | 340/310 A |

Primary Examiner—Donald J. Yusko
Attorney, Agent, or Firm—Collard, Roe & Galgano

[57] ABSTRACT

An address discrimination channel and terminal selection channels are established in the low-noise region of a first one of two succeeding cycles of an alternating current carrier wave, whereas returning channels are established in the low-noise region of the second cycle of the same. A receiver inserts an address discrimination phase-pulse signal and a terminal selection phase-pulse signal, respectively, into the address discrimination channel and the terminal selection channels of the aforementioned first cycle. A terminal equipment inserts a returning phase-pulse signal into the returning channels of the aforementioned second cycle when it detects the address discrimination phase-pulse signal on the address discrimination channel, and the terminal selection phase-pulse signal having an address code coinciding with the address code of said terminal equipment on the terminal selection channels.

3 Claims, 6 Drawing Figures

CARRIER CONTROL METHOD BY USING PHASE-PULSE SIGNALS

BACKGROUND OF THE INVENTION

1. Field of the Invention

The present invention relates to a carrier control method using phase-pulse signals, which performs information transmission between a terminal equipment and a receiver, by establishing a plurality of channels having a predetermined phase width, respectively, in each cycle of an alternating current carrier wave of a commercial frequency on low-voltage distributing lines and the like, and by inserting the phase-pulse signals in these channels.

2. Description of the Prior Art

This carrier control method is suited for automatically reading a watt-hour meter installed in each customer facility and for the centralized control of the loads carried by the customers. In the prior art of automatic meter reading by this method, a terminal equipment transmits one phase-pulse upon each unit of energy consumption by the customer, and a receiver counts the phase-pulses and memorizes the result as an automatically readable read value. In this case, however, since the read value is not stored in the terminal equipment, but one phasepulse is transmitted every time a unit amount of energy is consumed, the phase-pulses per unit amount of consumption by individual customers which are generated at random might be frequently transmitted when the conditions of the distributing lines are bad (for example, the loads are too large, adverse noise due to switching on the lines), causing transmission failures. If errors are introduced into counting and memory of the read value in the receiver by the transmission failures, they are gradually accumulated over a long period, so that they cannot be automatically corrected. In order to prevent this, it is desirable that the read datum of electric energy be stored in the watt-hour meter or in the terminal equipment in the electrically readable state, so that the read datum may be transmitted when the conditions of the low-voltage distributing lines are good.

As a transmission method of the read datum by the phase-pulse signals, as shown in FIG. 1, there exists a method in which a phase-pulse signal $P_1$ composed of a start signal and a terminal address code is established by superposing one phase-pulse 2 on one cycle of an alternating current carrier wave 1, and by using a plurality of cycles, and where the phase-pulse signals $P_1$ is sent to a terminal equipment, and in which the selected terminal equipment uses the plural cycles so as to return back a phase-pulse signal $P_2$ of a returning datum. However, this method has its transmission delayed, and requires an error control, such as a transmission reference, especially in the case of any transmission lines of bad quality, so that its application is limited due to its transmission speed and its complicated construction of devices. As shown in FIG. 2, therefore, there has been developed by way of the present application a method, now issued as U.S. Pat. No. 4,179,624, in which channels $C_1$ to $C_{20}$ are established in the low-noise region of one cycle of the alternating current carrier wave 1, such that the channels $C_1$ to $C_8$ are assigned to terminal selection channels $A_1$, the channels $C_9$ and $C_{10}$ to figure selection channels $A_2$, and the channels $C_{11}$ to $C_{20}$ to returning channels $A_3$, corresponding to the decimal numbers 0 to 9.

According to this method, however, since, in the case of the distributing lines, the channels cannot be established in one cycle of the alternating current carrier wave 1, except in the vicinity of a zero point having few noise perturbations, the width of one channel is narrowed, if the terminal selection channels $A_1$, the figure selection channels $A_2$ and the returning channels $A_3$ are so fashioned as to have one hundred or more terminals for one line from a practical requirement of the automatic reading operation or the like.

As a result, that channel may possibly be influenced by the succeeding oscillations of the signal of the preceding channel. Especially, the phase-pulse signals for selecting the terminals and the figures are inserted at the receiver so that they have a remarkably high level at the receiver, but the returning phase-pulse signal to be returned back from the terminal on the returning channel $A_3$ has a low level, because it has been attenuated while it is being sent from a distance.

It therefore takes a considerable time period for the succeeding oscillations of the terminal and figure selection phase-pulse signals having high levels to be attenuated to the low level of the returning phase-pulse signal. On the other hand, if the receiving threshold level of the receiver is lowered to match the level of the returning phase-pulse signal, the returning datum may be influenced to deviate by the succeeding oscillations of the terminal figure selection phase-pulse signals.

SUMMARY OF THE INVENTION

It is therefore, an object of the present invention to provide a carrier control method using phase-pulse signals, which enables the widening of the widths of channels, without reducing the numbers of terminal equipment and returning channels per line, the elimination of any control or influence to be exerted upon the returning phase-pulse signals sent from a receiver, and the connection of the terminal equipment in either a positive or an inverse phase.

In the present invention, since an address discrimination phase-pulse signal and a terminal selection phase-pulse signal are sent from a receiver to a terminal equipment in the low-noise region of a first one of two succeeding cycles of an alternating current carrier wave, whereas a returning phase-pulse signal is returned back from the terminal equipment to the receiver in the low-noise regions of the second cycle, the number of channels for one cycle in the low-noise region can be reduced, so that the widths of the channels can be widened, without reducing the number of terminal equipments, and the returning channels per line. Moreover, since the trailing end of the terminal selection channels, and the leading end of the returning channels are sufficiently spaced from one another, it is possible to eliminate any influence which might otherwise be exerted upon the returning phase-pulse signals transmitted from the receiver. Furthermore, the terminals can be connected in either a positive or an inverse phase by sending both the address discrimination phase-pulse signal and the terminal selection phase-pulse signal from the receiver in both the positive and inverse phases for every other cycle series.

BRIEF DESCRIPTION OF THE DRAWINGS

Other objects and features of the present invention will become apparent from the following detailed description considered in connection with the accompanying drawings, which disclose several embodiments of the invention. It is to be understood that the drawings are to be used for the purposes of illustration only, and not as a definition of the limits of the invention.

In the drawings, wherein similar reference characters denote similar elements throughout the several views.

DETAILED DESCRIPTION OF THE PREFERRED EMBODIMENT

Figure 1:
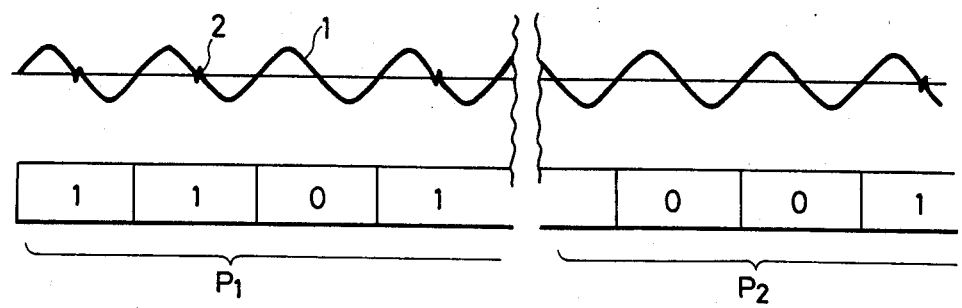
FIG. 1 is a waveform diagram showing one example of a method for transmitting the phase-pulse signals in accordance with the prior art.
Figure 2:
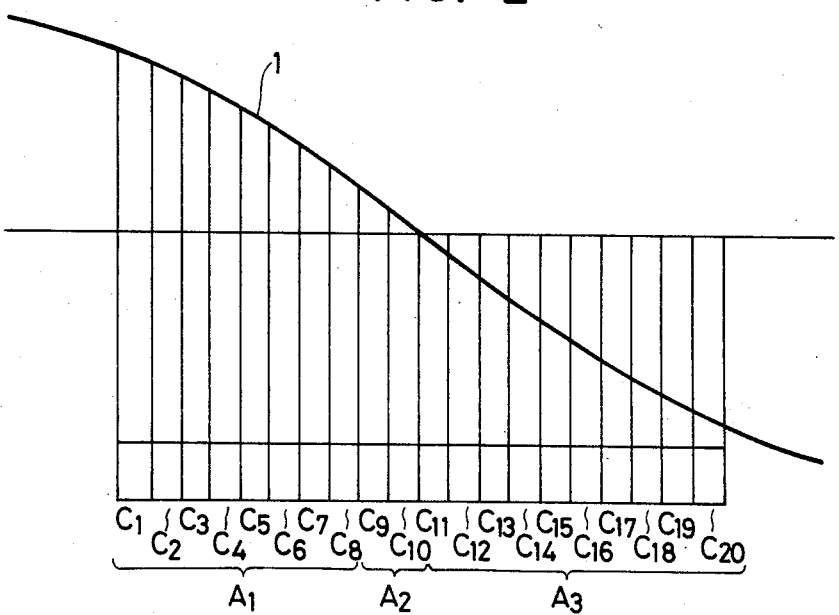
FIG. 2 is a channel chart diagram showing another example of the phase-pulse signal transmitting method according to the prior art.

FIGS. 1 and 2 illustrate prior art techniques. On the other hand, FIGS. 3–6 illustrate features of one embodiment of the present invention.

Figure 3:
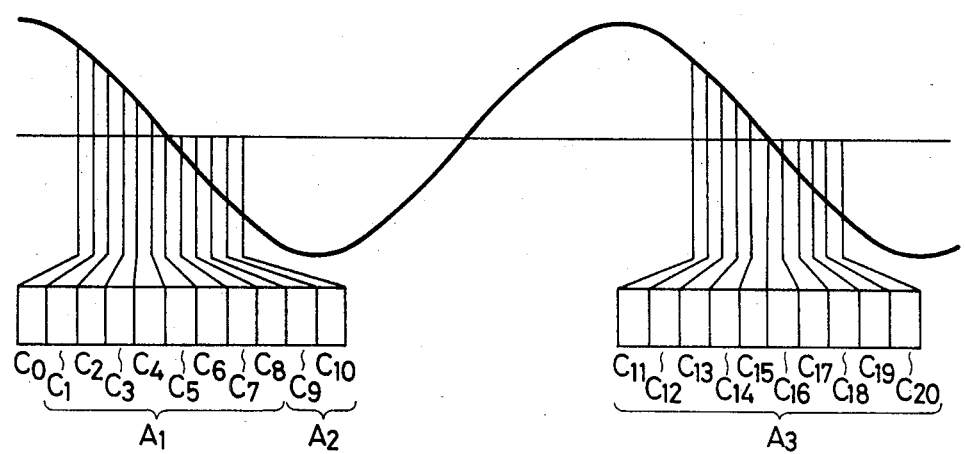
FIG. 3 is a channel chart diagram showing one embodiment of the present invention.

In FIG. 3, which shows one example of establishing channels in accordance with the present invention, channels $C_0$ to $C_{20}$ are established in the two succeeding cycles of an alternating current carrier wave 1. In the low-noise region of the first cycle of the same, the channel $C_0$ is assigned to the address discrimination channel, the channels $C_1$ to $C_8$ to the terminal selection channels $A_1$, and the channels $C_9$ and $C_{10}$ to the figure selection channels $A_2$. Channels $C_{11}$ to $C_{20}$ are established in the low-noise region of the second cycle of the same, and assigned to the returning channels $A_3$. Into the address discrimination channel $C_0$, there is inserted an address discrimination phase-pulse signal, which has a code "1". Into the terminal selection channels $A_1$, there is inserted a terminal selection phase-pulse signal which has a coded terminal address. Into the figure selection channels $A_2$ there is inserted a figure selection phase-pulse signal, which has a code for designating a figure. Into the returning channels $A_3$, there is inserted a returning phase-pulse signal, which corresponds to the figure designated in a decimal number. Incidentally, the respective figures of a datum can be sequentially returned back for each predetermined time period. In this case, the figure selection channels $A_2$, and the figure selection phase-pulse signal are unnecessary. Moreover, the datum to be returned need not be decimally returned, but may be returned in a binary coded decimal code, or in a purely binary code.

Figure 4:
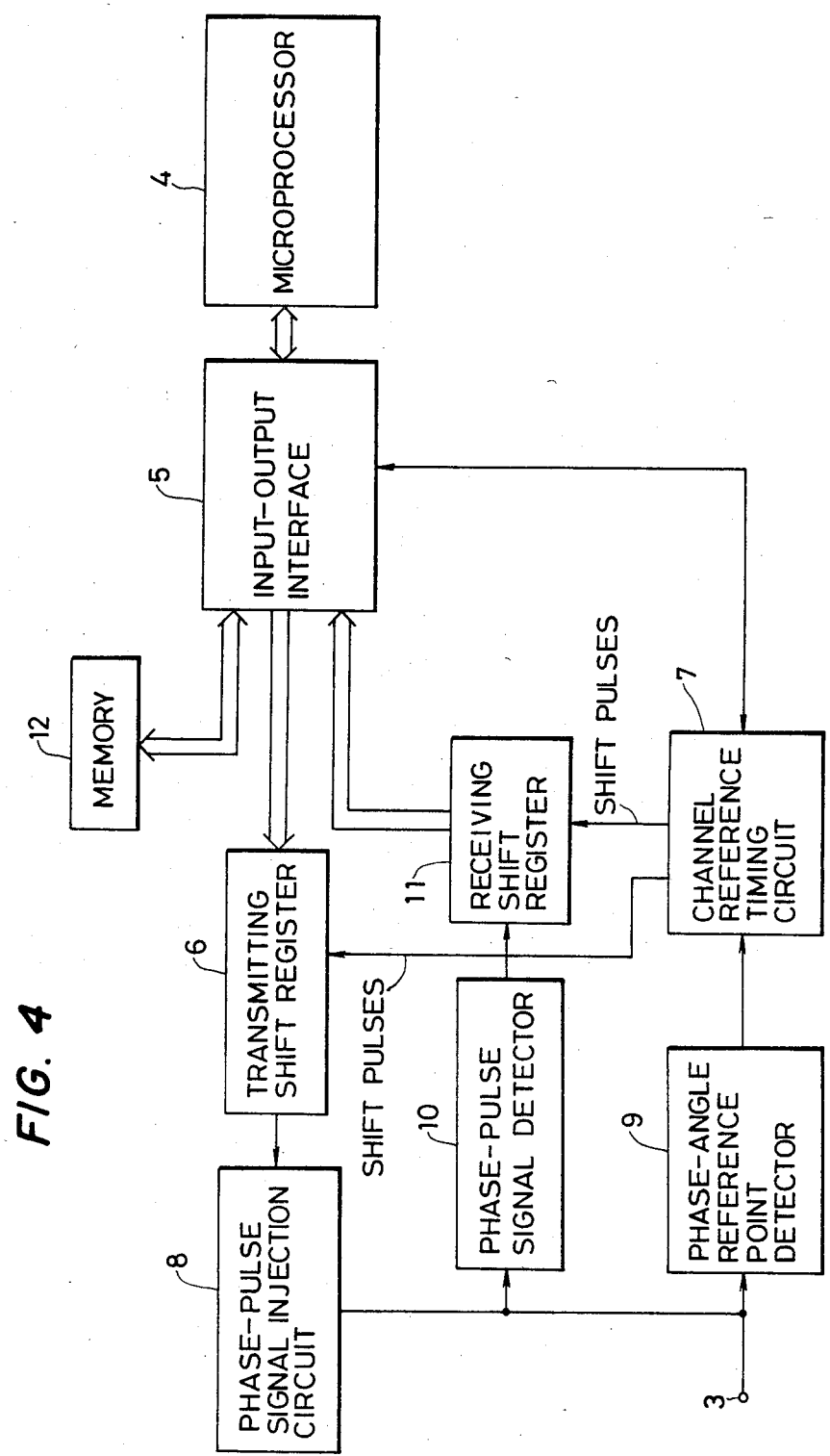
FIG. 4 is a block diagram showing one example of a receiver for carrying out the present invention.
Figure 5:
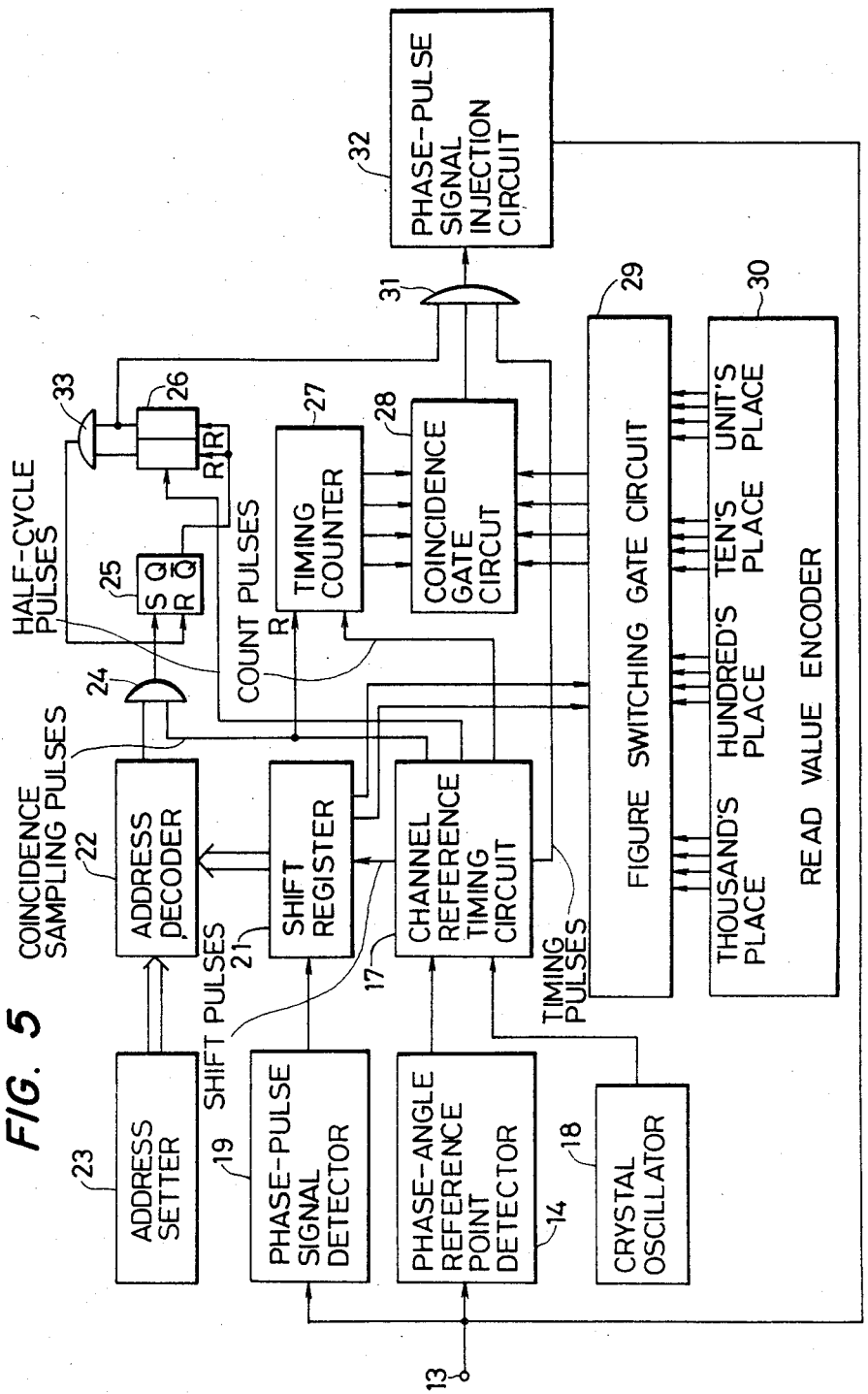
FIG. 5 is also a block diagram showing one example of the terminal equipment of the same.
Figure 6:
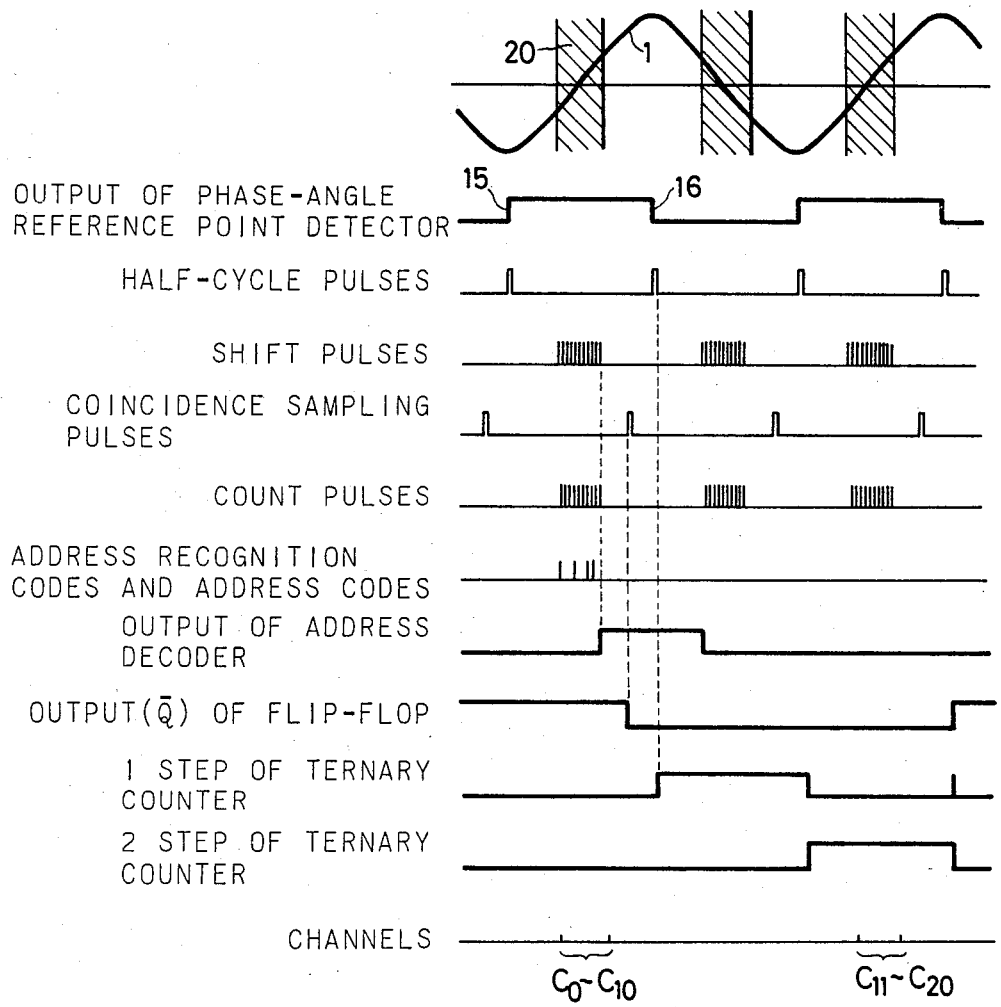
FIG. 6 is a timing chart applicable to the terminal equipment.

FIGS. 4, 5 and 6, respectively, show one example of the receiver, one example of the terminal equipment, and a timing chart diagram applicable to the terminal equipment. In the receiver, a terminal 3 is connected to a low-voltage distributing line. A microprocessor 4 is programmed to transfer an address discrimination code, the address code of a terminal equipment going to a datum, and a figure designation code through an input-output interface 5 to a transmitting shift register 6. The address discrimination code, the address code and the figure designation code thus inputted into transmitting shift register 6 are sent to a phase-pulse signal insertion circuit 8 in response to shift pulses from a channel reference timing circuit 7, so that the address discrimination phase-pulse signal and the figure selection phase-pulse signal are inserted into the channels $C_0$ to $C_{10}$ of the alternating current carrier wave 1. The channel reference timing circuit generates one shift pulse for each of channels $C_0$ to $C_{10}$ and channels $C_{11}$ to $C_{20}$ with reference to the phase-angle reference point ($\pi/2$ or $3\pi/2$) of the alternating current carrier wave 1, which has been detected by a phase-angle reference point detector 9.

The returning phase-pulse signal sent from the terminal equipment is detected by a phase-pulse signal detector 10, and serves as an input into a receiving shift register 11. The code thus inputted into the receiving shift register 11 is processed by microprocessor 4, and is stored in a memory 12.

At the terminal equipment in FIG. 5, a terminal 13 is connected to the low-voltage distributing line. A phase-angle reference point detector 14 detects the phase-angle reference points 15 and 16 (as shown in FIG. 6) of the alternating reference timing circuit 17. This channel reference timing circuit 17 responds to the high-frequency pulses from a crystal oscillator 18 to generate half-cycle pulses, shift pulses, coincidence sampling pulses, count pulses and timing pulses with reference to the phase-angle reference point 15 or 16. The shift pulses are generated in each half cycle at phase angles corresponding to the channels $C_0$ to $C_{11}$, and the count pulses are generated in each half cycle at phase angles corresponding to the channels $C_{11}$ to $C_{20}$, but the timing pulses may be the same as the shift pulses. A phase-pulse signal detector 19 detects the address discrimination phase-pulse signal, the terminal selection phase-pulse signal, and the figure selection phase-pulse signal, which have been inserted into the low-noise region 20 of the alternating current carrier wave 1, to have them restore the address discrimination code, the address code and the figure designation code and to send them to a shift register 21. An address decoder 22 sends a high-level output to an AND gate 24, when it detects that the address discrimination code is at "1", and that the address code coincides with its own address code, which has been set by an address setter 23. As a result, the AND gate 24 is opened and feeds the high-level output, when it receives the coincidence sampling pulse, to the set input terminal S of a flip-flop 25, so as to drop the output of its output terminal $\overline{Q}$ to a low level. As a result, a ternary counter 26 has its reset input reduced to zero to count the half-cycle pulses. Moreover, a timing counter 27 is reset by the coincidence sampling pulse to count the count pulses, and to send its counted value in the binary coded decimal code to a coincidence gate circuit 28. The figure designation code is sent from shift register 21 to a figure switching gate circuit 29, which extracts the value (in the binary coded decimal code) of the designated figure from a read value encoder 30, and sends it to coincidence gate circuit 28.

Ternary counter 26 sends the high-level output to an AND gate 31, when it counts two half-cycle pulses. Thus, there is a lapse of one cycle when the two half-cycle pulses are counted. As a result, the second cycle of the returning channels $C_{11}$ to $C_{20}$ is entered. Moreover, when the counted value of timing counter 27, and the value from read value encoder 30 coincide, coincidence circuit 28 sends its output through circuit 32, which inserts the phase pulses into only one of returning channels $C_{11}$ to $C_{20}$, that corresponds to that value, and sends it as the returning phase-pulse signal to the receiver. When the ternary counter 26 counts the third half-cycle pulse, it resets the flip-flop 25 through an AND gate 33, and in turn is reset by the output of the output terminal $\overline{Q}$.

The returning phase-pulse signal returned from another terminal equipment is not erroneously received, because it contains no address discrimination phase-pulse signal. The address discrimination phase-pulse signal can be used as the pilot signal for level detection and for phase-angle correction.

Thus, while only one embodiment has been shown and described, it is obvious that other changes and variations are possible without departing from the spirit and scope of the invention.

What is claimed is:

1. A carrier control method using phase-pulse signals, comprising the steps of:

forming an address discriminating channel and a plurality of terminal selection channels having a respective predetermined phase width in a low-noise region of a first one of every two succeeding cycles of an alternating current carrier wave, and a plurality of return channels having said respective predetermined phase width in the low-noise region of the second cycle of said every two succeeding cycles, said low-noise region being in the vicinity of the zero phase of a predetermined phase in a cycle of the alternating current carrier wave;

inserting an address discrimination phase-pulse signal in said alternating current carrier wave in said address discrimination channel of said first cycle and a terminal selection phase-pulse signal in said alternating current carrier wave in said terminal selection channels of said first cycle at a receiver; and inserting a return phase-pulse signal in said alternating current carrier wave in said returning channels of said second cycle at a terminal equipment, when said address discrimination phase-pulse signal is detected on said address discrimination channel, and when said terminal selection phase-pulse signal having an address code coinciding with the address code of said terminal equipment is detected on said terminal selection channels.

2. The carrier control method of claim 1, further comprising the steps of;

forming figure selection channels in the low-noise region of said first cycle; and inserting a figure selection phase-pulse signal into the figure selection channels at said receiver.

3. The carrier control method of claim 1, which further includes a counting operation by means of a ternary counter of the half-cycle pulse which is generated at each half cycle of the alternating current carrier wave, when the terminal selection phase-pulse signal having an address code coinciding with the address code of said terminal equipment is detected so that the beginning of said second cycle is defined when the counted value of said ternary counter reaches a predetermined value of 2.

* * * * *